Patented Aug. 14, 1934

1,970,280

UNITED STATES PATENT OFFICE 1,970,280

SILICEOUS PRODUCT AND PROCESS OF MAKING THE SAME

Arthur B. Cummins, Plainfield, N. J., assignor to Johns-Manville Corporation, New York, N. Y., a corporation of New York No Drawing. Application April 11, 1932
Serial No. 604,671

11 Claims. (Cl. 252—2)

This invention relates to a siliceous product and process of making the same, and particularly to the product resulting from the fritting together of very fine particles of siliceous material.

A preferred embodiment of the invention is the product resulting from and the process of intimately mixing unusually finely divided or impalpable diatomaceous earth with a small proportion of a flux, such as sodium carbonate, and calcining the mixture to the temperature of incipient fusion or fritting. The calcined product may then be cooled and submitted to mild disintegration, to give a product containing a large proportion of more or less spherular aggregations.

An object of the invention is to provide a process of forming very fine siliceous particles into fritted aggregates that are much larger than the original siliceous particles. Another object is to provide a material adapted for use as an abrasive which will crush under the application of such a pressure as might otherwise produce undesirable scratching of an object being abraded or polished, except for the crushing of the aggregate. A further object is to provide a porous siliceous material in the form of an aggregate sufficiently coarse to be adapted for use in certain filtration operations, such as filtration in a gravity filter. An additional object is to provide a lightweight insulating material that is less compressible and that dusts less in pouring or handling than a conventional insulating powder. Other objects and advantages will appear from the detailed description that follows.

In U. S. Patent 1,502,547 to Calvert, Dern and Alles, there is described a process of calcination of comminuted diatomaceous earth with a chemical adapted to flux the clay present as an impurity or cause sintering or fritting of the particles of diatomaceous earth. The calcination, as described in the patent, is made suitably in a rotary kiln or in other conventional equipment in which the material being calcined lies upon itself in a mass or condition providing close and continuous contact between the individual particles therein. This conventional method of calcination is to be distinguished from a method, forming no part of this invention, in which method there is effected calcination of particles dispersed in an aeriform suspension; in this case close and continuous contact between the individual particles does not obtain. It will be obvious also that when the calcination is made in a rotary kiln, the mass being calcined is subjected to tumbling. The calcination is made after mixing approximately 5 parts by weight of salt or the like into 100 parts of diatomaceous earth of grade commonly used in the filtration of raw sugar and other solutions. Such a grade of diatomaceous earth may have approximately the following particle size distribution, as determined by the Oden sedimentation test:

Coarser than 10 microns_____ 22% by weight
10 to 2 microns_____ 52%
Less than 2 microns_____ 26%

When comminuted diatomaceous earth of this grade is calcined with salt, in the manner described, at about 1800° F., there is produced a product which, after cooling and mild impact disintegration, as by passage through a high speed blower, shows the following results on a wet screening test:

On 30-mesh_____ 0.5% by weight
On 150-mesh_____ 6.0%
On 200-mesh_____ 10.5%
On 325-mesh _____ 13.0%

The wet screening test is made in a usual manner, as by rotating a screen or sieve in which a weighted sample is present while the sieve is partly immersed in water to such a depth that water covers the screen in the bottom of the sieve and washes through the screen material of such fineness as to pass the particular mesh of screen in use. The data tabulated above shows that 13% only of the calcined and lightly milled product is too coarse to pass through the 325-mesh screen, in such a test.

By the process of the present invention, entirely different results are obtained, as shown by the following illustrative examples.

Example 1

In a usual process of preparing diatomaceous earth of filtration grade, which consists largely of silica, the earth is first dried, then comminuted or milled and suspended in an air or aeriform stream. This stream is passed through cyclones or over settling chambers, for the removal, by deposition, of the major portion of the material. In such separation, however, not all of the particles are deposited. Thus, the larger particles are removed, whereas the unusually fine particles pass in part through the cyclone or over the settling chambers, without deposition. These unusually finely divided or air-separated particles may then be removed from the air stream, as by passage into fabric-enclosed chambers, such as a conventional stocking dust collector. In such a collector the suspended particles are retained while air escapes through the fabric. There is thus obtained an impalpable powder sometimes known as "bag house" diatomaceous earth. An Oden sedimentation test of a sample of such bag house grade shows it to consist of particles of size averaging less than 2 microns. A typical analysis follows.

Coarser than 10 microns —————— 0.5% by weight
10 to 2 microns ————————————— 34.5%
Less than 2 microns ——————————— 65.0%

The term "averaging", as used herein, refers to proportion by weight. Thus, particles are said to be of sizes averaging less than 5 microns when more than 50 per cent by weight of the particles is comprised in the fraction finer than 5 microns.

To 100 parts by weight of such unusually fine diatomaceous earth, suitably containing particles averaging individually less than 2 microns in size, there is added 6 parts of soda ash; this is sifted, through a 30-mesh screen, into the diatomaceous earth with which it is then mixed. The entire mixture, after being made intimate, is then sifted through a screen, such as one with 30 meshes to the linear inch. The mixture is then calcined as described in the said patent at approximately 1800° F. for about ½ hour. After being thus calcined, the material is cooled and submitted to mild, impact disintegration, as by passage through a blower, of the propeller type, revolving at about 1800 R. P. M.

The thus made product can be seen to be strikingly different from the product made from filtration grade diatomaceous earth and described in the above mentioned patent. Thus, the new product appears to be granular. The grains comprise particles individually of the original fineness, but adhered together into aggregates by fritting, probably largely by a sodium silicate formed in situ, by the action of the soda ash at the temperature of calcination upon the siliceous powder. The individual granules are visible macroscopically. When tested for size of particles, by wet screening, the following results are obtained.

On 30-mesh ———————————————— 20% by weight
On 150-mesh ——————————————— 88%
On 325-mesh ——————————————— 96%

It will be noted that more than half of the product, in this instance, is finer than 30-mesh and coarser than 150-mesh.

*Example 2*

The procedure is the same as described under Example 1, except that the soda ash is added in the form of a solution. Thus, the unusually finely divided diatomaceous earth is made into a thin paste by adding a solution of the required weight of soda ash and stirring well to disperse thoroughly all the earth in the solution of soda ash. The mixture is then dried, the dried product crushed or milled to a powder, brushed through a 30-mesh screen, and again mixed thoroughly before calcination. The calcination is made as described above, at about 1800° F., for ½ hour. After the calcination is completed, the product is cooled and then disintegrated, as by passage through a blower.

*Example 3*

The procedure is the same as under Example 1, except that the air-separated diatomaceous earth used is even finer than there described, namely approximately 75% finer than 2 microns and approximately 45% finer than 1 micron, as measured by the Oden sedimentation test.

The properties of the products made as described in the above examples are unique. The color is practically white, unless there has been used a diatomaceous earth containing a considerable amount of impurities. The material feels granular and, under the microscope, shows a large proportion of small balls or spherules. While these are not perfect spheres, they are irregularly shaped balls. They are highly porous, have good absorptive capacity for liquids, have a low density, as measured by the pounds of material which occupy a cubic foot, are resistant to disintegration by moderate milling as by passage through a blower, and have a hardness or resistance to crushing, which can be adjusted, within limits, by the conditions of manufacture. The screen analysis of the product has been given above. The product is less readily compressed than ordinary calcined diatomaceous earth. Thus, the apparent density is increased from about 20 pounds to the cubic foot, for the loosely settled product, only to about 22 or 24 pounds by mild compression. Finally, the product when poured in air does not become suspended in the air, as dust, to the same extent as the usual type of diatomaceous earth powder.

Once the formation of the spherules has been observed, various explanations may be advanced to account for the result. It is probable that surface tension plays an important part in the formation of the spherules. When the unusually finely divided and practically impalpable powder is calcined with a flux, there is produced a cementing together of the particles into aggregates, accompanied or followed possibly by a drawing of the aggregates into more or less spherical form, under the influence of surface tension. When, on the other hand, there is used diatomaceous earth of filtration grade, as described in the above mentioned patent, the larger size of the individual particles and their degree of rigidity are probably sufficient to interfere with the formation of these very small spherules.

Regardless of what the explanation may be, there is a decided difference in the appearance and properties of the products of the calcinations of the unusually finely divided diatomaceous earth and the earth of particle sizes that has been calcined heretofore.

The new product is useful as an abrasive, as a filler in various compositions, as a thermal insulating material, and as a porous filter medium for gravity filters.

*Example 4*

A somewhat similar material is made by following the procedure of either Examples 1 or 2, except that a lower grade of unusually finely divided diatomaceous earth is substituted for the earth used above. Thus, there may be used a very fine, air-separated material, derived from diatomaceous earth of quality suitable for use in the manufacture of insulating bricks and containing approximately 7 to 10 percent of alumina, together with a larger proportion of iron than is present in the filtration grade of diatomaceous earth. The product of calcination of this low grade material with soda ash contains a large proportion of spherules, but is more dense and harder than the product obtained above and has a color that may be light pink or buff, depending upon the proportion of impurities, such as iron, that are present.

Example 5

The procedure of Examples 1 or 2 is followed, with the exception that finely ground crystalline silica is substituted for the diatomaceous earth as raw material. Thus, there may be used quartz so ground that the average particle size is finer than 5 microns, suitably finer than 2 microns, as measured by the Oden sedimentation test. In using such finely divided crystalline silica, a proportion of flux is chosen, after trial, for the particular quality of silica being used. Since the ground crystalline silica is less bulky than an equal weight of the very fine diatomaceous earth, it is usually best to use a proportion of flux which by weight is less than that used with diatomaceous earth. Thus, the amount of soda ash used may be 2 to 6, suitably 3 or 4 parts, by weight of soda ash, or its equivalent, for 100 parts of crystalline silica.

The product made from the ground crystalline silica, although considerably higher in density than the product made as described, for instance, in Examples 1 or 2, is nevertheless white and spherular. The product is useful in various ways, as, for example, as an abrasive or scouring agent.

The above details have been given for the purpose of illustration rather than limitation of the invention. Many variations may be made without departing from the scope of the invention. Thus, there may be varied the temperature of calcination. Temperatures of 1800 to 1900° F. are satisfactory for calcination of high grade diatomaceous earth, such as that from Lompoc, Calif. Materials containing a higher proportion of clay or alumina may be calcined at somewhat lower temperatures, as, for example, at 1700° F. Usually, the hardness of the product, as well as its degree of whiteness, increases with the temperature of calcination. Thus, a temperature of 1700° F. may give a pink colored product, whereas 1800° F. may give nearly white, and 1900° F. a still more nearly white product. Temperatures which are higher than necessary to produce the desired product should be avoided, as they are inclined to produce excessive sintering or slagging of the material and a hard product. Temperatures as high as 2000° F. are usually to be avoided, except with diatomaceous powder of unusually low alumina (clay) content.

The period during which the calcination at the maximum temperature is continued may be varied, within limits. It is understood that some time is required in raising a mixture to the temperature selected for the calcination. In commercial operations this preliminary heating may require as much as several hours. Following this period of gradual rise of temperature, the material may be maintained at the maximum, say 1800° F., for 15 minutes to several hours. Usually 15 minutes to 2 hours is preferred. A length of time that gives satisfactory results, without adding excessively to the cost of heat for the calcination, is ½ hour. In general, the period of calcination at the selected maximum temperature will depend in part upon the other conditions. Thus, exceptional strength of the fluxing material as an alkali, an excessive proportion of the flux, or an unusually high temperature of calcination, such as 1900° F., may be offset in part at least by shortening the time of calcination.

In place of soda ash (sodium carbonate), other fluxing materials may be used. In general, these materials should be adapted to produce or facilitate fritting at the temperature at which the mixture of the flux and the finely divided silica or siliceous material is to be calcined, as, for example, at 1800 to 1900° F. Also, the fluxes that are preferred at this time are of the class of alkaline salts, particularly the salt of an alkali metal with a weak acid, such as sodium or potassium carbonate or borax. For example, soda ash and borax are preferred at this time, because of the satisfactory results which they produce and their low prices. It will be observed that the materials which are preferred are fusible, and also that they are adapted to produce fritting, that is, incipient or partial fusion of silica at the temperatures of calcination. Also, the preferred fluxes are adapted to produce a silicate during the fritting of the siliceous particles. It is this fritting which adheres or binds together the individual particles into the spherules.

If a less hard product is desired, there may be substituted for the preferred fluxes some other material, such as one that is infusible but of alkaline properties, that is, adapted to develop alkalinity or to react with silica at the temperatures of calcination. Thus, there may be used a finely divided magnesium or calcium compound, such as the oxide, carbonate, or other salt.

The proportion of flux to silica may be varied, within limits, depending in part upon the temperature to which the silica and the flux is to be calcined, or upon the qualities desired in the finished product. High temperatures of calcination and/or a high proportion of flux to silica favor the formation of a relatively hard product. If the proportion of flux is very excessive, the product may be almost glassy, due to the large amount of fusion produced in the presence of the excessive amount of flux. A proportion of flux, such as soda ash or borax, that has been used successfully, is 2 to 8 parts by weight and preferably 3 to 7 parts for 100 parts of the finely divided silica. For making a product of degree of hardness that is preferred for most purposes, there may be used approximately 6 parts by weight of soda ash to 100 parts of the unusually finely divided diatomaceous earth, and the soda-ash-diatomaceous-earth mixture then calcined at approximately 1800° F. When a very low percentage of flux is used, as, for example, 2 parts by weight for 100 parts of finely divided siliceous material, there may be inadequate formation of spherules in the finished product. Also, the finished product may be pink, and whatever clusters or aggregates there are formed, may be soft, in fact, too soft for use as an abrasive or scouring agent. When borax is used in place of soda ash, the proportion of flux may be about the same as or somewhat decreased from that preferred for soda ash. Four to five parts by weight of borax to 100 parts of unusually finely divided diatomaceous earth is the proportion of borax preferred at this time.

Since many variations may be made from the illustrative details given, without departing from the scope of the invention, it is intended that the invention should be limited only by the terms of the claims interpreted as broadly as consistent with novelty over the prior art.

What I claim is:

1. A composition of matter comprising macroscopic granules resistant to disintegration by moderate milling and consisting largely of agglomerated particles of silica, the individual particles of silica in the agglomerates averaging less than 5 microns in size and being adhered together by fritting with an alkali metal salt of a weak acid.

2. A composition of matter comprising macroscopic granules resistant to disintegration by moderate milling and consisting largely of agglomerated particles of silica, the individual particles of silica in the agglomerates averaging less than 2 microns in size and being adhered together by a silicate formed in situ.

3. An article of manufacture adapted for use as an abrasive comprising macroscopic granules including agglomerated particles of diatomaceous earth, the individual particles of diatomaceous earth averaging less than 2 microns in size and being adhered together by fritting at approximately 1800° F. in the presence of an alkali metal carbonate.

4. The product of the calcination of an intimate mixture of impalpably finely divided, air-separated diatomaceous earth and a small amount of a flux at a temperature of partial fusion of the mixture and in the condition of close and continuous contact between the individual particles of the mixture.

5. A composition of matter comprising particles consisting of macroscopic granules of agglomerated particles of ground crystalline silica, the individual particles averaging less than 5 microns in size and being adhered together into aggregates by a silicate formed in situ.

6. A composition of matter comprising particles consisting of macroscopic granules of agglomerated particles of ground crystalline silica, the individual particles averaging less than 2 microns in size and being adhered together into aggregates by fritting with a small proportion of a flux adapted to facilitate the fritting at a temperature of about 1800° F.

7. A porous spherular product resistant to disintegration by moderate milling, more than 50% of which is finer than 30-mesh and coarser than 150-mesh, said product comprising diatomaceous earth particles fritted together by calcination with a flux.

8. The process of making porous aggregations which comprises intimately mixing a small proportion of flux of the type described with finely divided diatomaceous earth containing more than 50 percent by weight of particles of size smaller than 2 microns, and calcining the mixture at an elevated temperature to produce sintering and the formation of aggregates resistant to moderate milling and in condition providing close and continuous contact between the individual particles of the mixture.

9. The process which comprises preparing a material consisting largely of silica in the form of aggregated particles of size averaging individually less than 2 microns, making a mixture of said material with a small amount of a flux adapted to cause fritting at a temperature of about 1800° F., and calcining and tumbling the mixture whereby fritting is produced and the individual particles of silica are agglomerated into macroscopic granules.

10. A porous filter medium comprising macroscopic granules resistant to moderate milling and consisting largely of diatomaceous earth in the form of aggregated particles, the individual particles in the aggregated material averaging less than two microns in size and being adhered together by fritting in the presence of a flux.

11. A composition of matter comprising macroscopic granules and consisting largely of agglomerated particles or silica, the individual particles of silica in the agglomerates averaging less than five microns in size and being adhered together by fritting with a small proportion of a flux.

ARTHUR B. CUMMINS.